US012607087B1

(12) United States Patent
Alharbi et al.

(10) Patent No.: US 12,607,087 B1
(45) Date of Patent: Apr. 21, 2026

(54) DEVICES AND SYSTEMS FOR DRILLING A WELLBORE

(71) Applicant: SAUDI ARABIAN OIL COMPANY, Dhahran (SA)

(72) Inventors: Atallah N. Alharbi, Dammam (SA); Mohammed Al-Shehri, Dammam (SA); Amjad Alshaarawi, Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 19/084,006

(22) Filed: Mar. 19, 2025

(51) Int. Cl.

| | |
|---|---|
| ***E21B 21/08*** | (2006.01) |
| ***B08B 9/023*** | (2006.01) |
| ***E21B 31/00*** | (2006.01) |
| ***E21B 33/08*** | (2006.01) |
| *E21B 33/06* | (2006.01) |

(52) U.S. Cl.
CPC ............ *E21B 33/085* (2013.01); *B08B 9/023* (2013.01); *E21B 21/08* (2013.01); *E21B 31/035* (2020.05); *B08B 2209/02* (2013.01); *E21B 33/06* (2013.01)

(58) Field of Classification Search
CPC ........ E21B 33/085; E21B 33/06; E21B 21/08; B08B 9/023; B08B 2209/02
See application file for complete search history.

(56) References Cited

U.S. PATENT DOCUMENTS

| | | | | | |
|---|---|---|---|---|---|
| 3,128,614 | A * | 4/1964 | Auer | E21B 33/085 | 464/163 |
| 4,363,357 | A * | 12/1982 | Hunter | E21B 33/085 | 285/55 |
| 8,714,240 | B2 * | 5/2014 | Bailey | E21B 36/001 | 166/84.2 |

(Continued)

FOREIGN PATENT DOCUMENTS

| | | | |
|---|---|---|---|
| CA | 3 016 460 | A1 | 9/2017 |
| EP | 3 559 395 | B1 | 6/2022 |
| WO | 2017/171853 | A1 | 10/2017 |

OTHER PUBLICATIONS

Bernard, Christopher James (C.J.) et al., “Manage the Pressure-Drive the Results”; Proceedings of the SPE/AAPG/SEG Unconventional Resources Technology Conference Conference; Paper No. URTEC-1593055-MS; pp. 1-13; Aug. 12, 2013 (13 pages).

*Primary Examiner* — Kenneth L Thompson
(74) *Attorney, Agent, or Firm* — Osha Bergman Watanabe & Burton LLP

(57) ABSTRACT

A rotating control device includes an inner seal assembly configured to be disposed around a drill string and includes at least one pressure seal. The rotating control device includes an outer body configured to be operatively coupled to a blowout preventor. The outer body includes a primary cavity configured to receive, at least partially, the inner seal assembly, and a secondary cavity configured to direct fluid flow and including at least one ramping surface configured to reduce a pressure fluctuation. The primary cavity and the (Continued)

secondary cavity are fluidly connected by a passageway therebetween. The rotating control device also includes at least one outer seal configured to prevent fluid leakage between the outer body and the inner seal assembly; at least one outer bearing assembly configured to facilitate rotation of the inner seal assembly; and a fluid outlet fluidly connected to other drill equipment configured to manage a wellbore pressure.

20 Claims, 5 Drawing Sheets

(56) References Cited

U.S. PATENT DOCUMENTS

| | | | | |
|---|---|---|---|---|
| 9,683,422 | B2 * | 6/2017 | Boyd | E21B 33/068 |
| 10,655,422 | B2 | 5/2020 | Faugstad | |
| 10,941,629 | B2 * | 3/2021 | Yousef | E21B 33/085 |

* cited by examiner

DEVICES AND SYSTEMS FOR DRILLING A WELLBORE

BACKGROUND

Hydrocarbons can be used as fuel for power generation and transportation vehicles. Exploration and exploitation of hydrocarbons often requires drilling into the ground from which hydrocarbons are extracted. The process of drilling wells uses drilling muds to facilitate the process of the drill bits drilling into rock and to prevent fluids from the subsurface causing unwanted issues. Managed pressure drilling is a technique designed to enable drilling with controlled downhole pressure in order to reduce drilling troubles such as lost circulation and stuck-pipe incidents. An inability to manage pressure within the well leads to higher costs and greater risk of injury for workers.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some aspects, the techniques described herein relate to a rotating control device for sealing an annulus of a wellbore while drilling using a drill string and a blowout preventor. The rotating control device includes an inner seal assembly, an outer body, at least one outer seal, at least one outer bearing assembly, and a fluid outlet. The inner seal assembly is configured to be disposed around the drill string and includes at least one pressure seal. The outer body is configured to be operatively coupled to the blowout preventor. The outer body includes a primary cavity configured to receive, at least partially, the inner seal assembly, and a secondary cavity configured to direct fluid flow and including at least one ramping surface configured to reduce a pressure fluctuation. The primary cavity and the secondary cavity are fluidly connected by a passageway therebetween. The at least one outer seal is configured to prevent fluid leakage between the outer body and the inner seal assembly. The at least one outer bearing assembly is configured to facilitate rotation of the inner seal assembly. The fluid outlet is fluidly connected to other drill equipment configured to manage a wellbore pressure within the annulus of the wellbore.

In some aspects, the techniques described herein relate to a drilling system for managing pressure within an annulus of a wellbore while drilling. The drilling system includes a managed pressure drilling (MPD) system. The MPD system includes a derrick configured to suspend and rotate a drill string, a managed pressure drilling choke, a blowout preventer, and a rotating control device. The drill string is suspended by the derrick within the wellbore and includes a bottom hole assembly configured to cut into a subsurface rock. The managed pressure drilling choke is configured to partially close to apply a back pressure on the wellbore to drill the wellbore using a managed pressure drilling technique. The blowout preventor is installed downhole from the rotating control device on the wellbore. The rotating control device is configured to provide a managed pressure drilling flow path from the annulus of the wellbore to the managed pressure drilling choke. The rotating control device includes an inner seal assembly, an outer body, at least one outer seal, at least one outer bearing assembly, and a fluid outlet. The inner seal assembly is configured to be disposed around the drill string and includes at least one pressure seal. The outer body is configured to be operatively coupled to the blowout preventor and includes a primary cavity configured to receive, at least partially, the inner seal assembly, and a secondary cavity configured to direct fluid flow and includes at least one ramping surface configured to minimize a pressure fluctuation. The primary cavity and the secondary cavity are fluidly connected by a passageway therebetween. The at least one outer seal is configured to prevent fluid leakage between the outer body and the inner seal assembly. The at least one outer bearing assembly is configured to facilitate rotation of the inner seal assembly. The fluid outlet fluidly connected to other equipment of the managed pressure drilling system configured to manage a wellbore pressure within the annulus of the wellbore.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
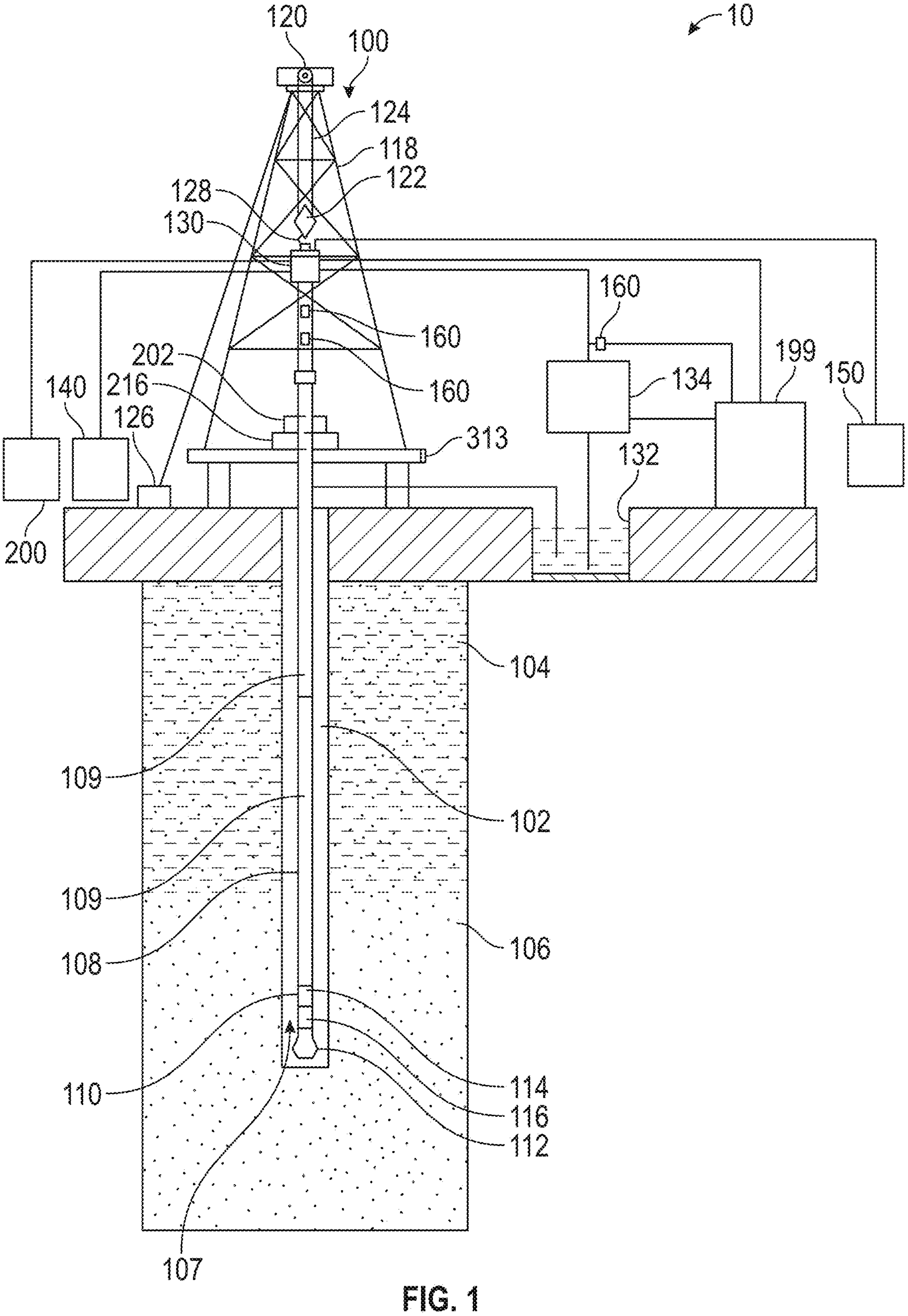
FIG. 1 depicts a drilling system with a rotating control device in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details, or with other methods, components, materials, and so forth. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a fluid sample" includes reference to one or more of such samples.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

As used herein, the term "coupled" or "coupled to" or "connected" or "connected to" "attached" or "attached to" may indicate establishing either a direct or indirect connection, and is not limited to either unless expressly referenced as such.

As used herein, fluids may refer to slurries, liquids, gases, and/or mixtures thereof. It is to be further understood that the various embodiments described herein may be used in various stages of a well (land and/or offshore), such as rig site preparation, drilling, completion, abandonment etc., and in other environments, such as work-over rigs, fracking installation, well-testing installation, oil and gas production installation, without departing from the scope of the present disclosure.

In the following description of FIGS. 1-4, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Disclosed herein are devices and systems for managed pressure drilling that include a rotating control device having a pressure seal. The rotating control device includes a rotating mechanism, a cooling system, restrictor plates, and a cleaning system. The rotating control device includes at least one ramping surface to mitigate pressure fluctuations due to pressure decreases in relation to an annulus pressure. The pressure decreases also called "drops" may be caused by sharp angles of the rotating control device. The rotating control device provides mitigation of pressure seal degradation to prolong sealing integrity of the managed pressure drilling system which reduces drilling downtime and maintains drilling back pressure.

FIG. 1 shows a well site (100) with a drilling system (10) in accordance with one or more embodiments. The well site (100) shown in FIG. 1 is used herein as an example well site. Well sites may be configured in a myriad of ways; therefore, the well site (100) is not intended to be limiting with respect to the particular configuration of the drilling equipment. The well site (100) is depicted as being on land. In other examples, the well site (100) may be offshore, and drilling may be carried out with or without use of a marine riser. A drilling operation, using the drilling system (10), at the well site (100) may include drilling a wellbore (102) into a subsurface including various formations (104, 106). For the purpose of drilling a new section of wellbore (102), a drill string (108) is suspended within the wellbore (102) forming an annulus (107) with the walls of the wellbore (102).

The drill string (108) may include one or more drill pipes (109) connected to form a conduit and a bottom hole assembly (BHA) (110) disposed at the distal end of the conduit. The BHA (110) may include a drill bit (112) to cut into the subsurface rock. The BHA (110) may include measurement tools, such as a measurement-while-drilling (MWD) tool (114) and logging-while-drilling (LWD) tool (116). Measurement tools (114, 116) may include sensors and hardware to measure downhole drilling parameters, and these measurements may be transmitted to the surface using any suitable telemetry system known in the art. The BHA (110) and the drill string (108) may include other drilling tools known in the art but not specifically shown.

The drill string (108) may be suspended in the wellbore (102) by a derrick (118). A crown block (120) may be mounted at the top of the derrick (118), and a traveling block (122) may hang down from the crown block (120) by means of a drilling line or cable (124). One end of the cable (124) may be connected to a draw works (126), which is a reeling device that can be used to adjust the length of the cable (124) so that the traveling block (122) may move up or down the derrick (118).

The traveling block (122) may include a hook (128) on which a top drive (130) is supported. The top drive (130) is coupled to the top of the drill string (108) and is operable to rotate the drill string (108). Alternatively, the drill string (108) may be rotated by means of a rotary table (not shown) on the drilling floor (131). Drilling fluid (commonly called mud) may be stored in a mud pit (132), and at least one mud pump (134) may pump the mud from the mud pit (132) into the drill string (108). The mud may flow into the drill string (108) through appropriate flow paths in the top drive (130) (or a rotary swivel, if a rotary table is used instead of a top drive to rotate the drill string (108)).

In one implementation, a control system (199) may be disposed at or communicate with the well site (100). The control system (199) may control at least a portion of a drilling operation at the well site (100) by providing controls to various components of the drilling operation. In one or more embodiments, the control system (199) may receive data from one or more sensors (160) arranged to measure controllable parameters of the drilling operation. As a non-limiting example, sensors (160) may be arranged to measure WOB (weight on bit), RPM (drill string rotational speed), GPM (flow rate of the mud pumps), and ROP (rate of penetration of the drilling operation).

In accordance with one or more embodiments, the drilling system (10) includes a power system (140). The power system (140) may be any suitable power system known to those skilled in the art for providing power to various components of the drilling system (10) that require electrical power to function. The power system (140) may be a portable power generator or may be a local power system distributed by a local power distribution grid. The power system (140) may include power equipment, hardware and/or software configured for power distribution. Hardware components may also include various network elements or control elements for implementing control systems, such as switches, routers, hubs, programmable logic controllers, remote terminal units, user equipment, or any other technical components for performing specialized processes. Power control elements, user devices, and network elements may be computer systems similar to the computer system (500) described in FIG. 5 and the accompanying description.

In accordance with one or more embodiments, the drilling system (10) may include a rig cooling system (150) configured to distribute cooling fluids to various components of the drilling system (10) to preserve integrity of various components such as pressure seals of a rotating control device. The rig cooling system (150) may include cooling equipment and hardware such as heat exchangers, pumps, hoses, pipes, fittings, among other various types of equipment and hardware. Cooling fluids may be a refrigerant, water, mud, air such as ambient air at the surface, or any fluid that is cooler relative to the fluid within the rotating control device during drilling operations. The cooling fluids may be cycled through one or more heat exchangers to cool the cooling fluids before being pumped into the wellbore (102). The rig cooling system may include hoses, and/or pipes fluidly connected to the rotating control device.

Sensors (160) may be positioned to measure parameter(s) related to the rotation of the drill string (108), parameter(s) related to travel of the traveling block (122), which may be used to determine ROP of the drilling operation, parameter(s) related to flow rate of the mud pump (134) parameter(s) related to the fluid flow within the annulus (107). For illustration purposes, sensors (160) are shown on the drill string (108) and proximate mud pump (134). The illustrated locations of sensors (160) are not intended to be limiting, and sensors (160) could be disposed wherever drilling parameters need to be measured. Moreover, there may be many more sensors (160) than shown in FIG. 1 to measure various other parameters of the drilling operation. Each sensor (160) may be configured to measure a desired physical stimulus.

During a drilling operation at the well site (100), the drill string (108) is rotated relative to the wellbore (102), and weight is applied to the drill bit (112) to enable the drill bit (112) to break rock as the drill string (108) is rotated. In some cases, the drill bit (112) may be rotated independently with a drilling motor. In further embodiments, the drill bit (112) may be rotated using a combination of the drilling motor and the top drive (130) (or a rotary swivel, if a rotary table is used instead of a top drive to rotate the drill string (108)).

While cutting rock with the drill bit (112), mud is pumped into the drill string (108). The mud flows down the drill string (108) and exits into the bottom of the wellbore (102) through nozzles in the drill bit (112). The mud in the wellbore (102) then flows back up to the surface in an annular space between the drill string (108) and the wellbore (102) with entrained cuttings. The mud with the cuttings is returned to the mud pit (132) to be circulated back again into the drill string (108). Typically, the cuttings are removed from the mud, and the mud is reconditioned as necessary, before pumping the mud again into the drill string (108). In one or more embodiments, the drilling operation may be controlled by the control system (199).

Figure 2:
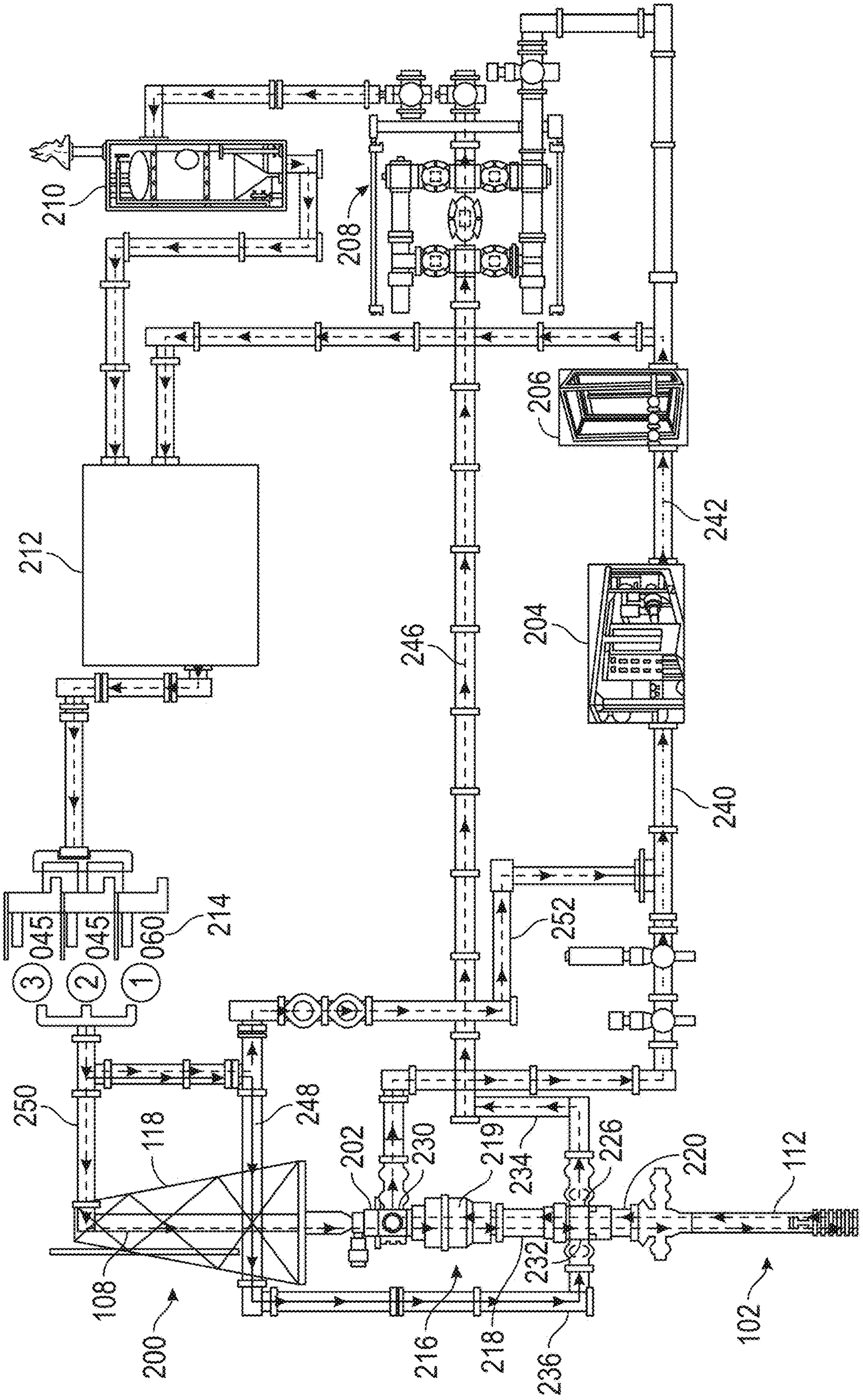
FIG. 2 depicts a managed pressure drilling system with a rotating control device in accordance with one or more embodiments.
Figure 3:
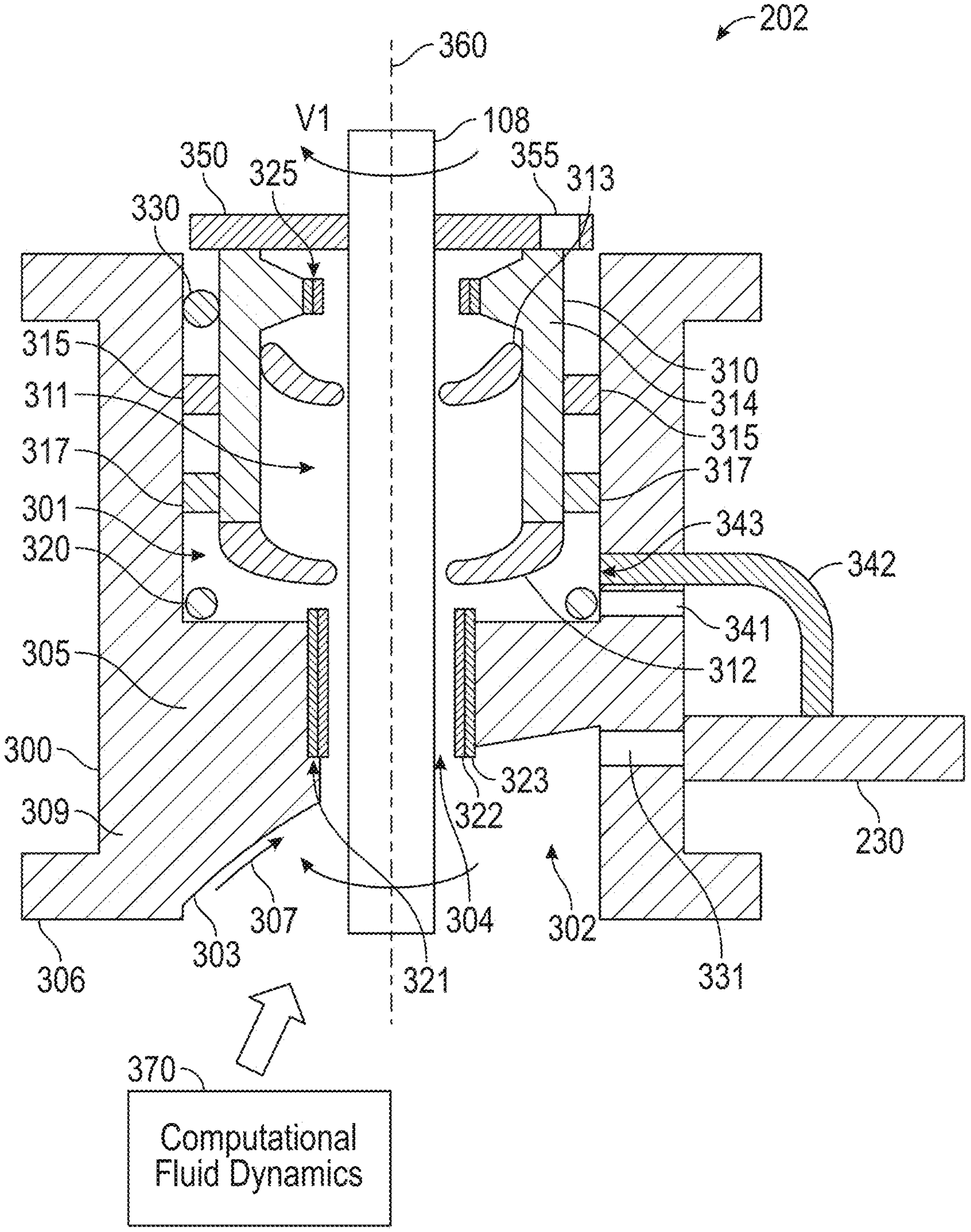
FIG. 3 depicts a cross-sectional view of a rotating control device in accordance with one or more embodiments.

In managed pressure drilling (MPD) operations, the drilling mud is circulated into the wellbore (102) through the drill string (108) and exits the annulus (107) of the wellbore (102) through a rotating control device ("RCD") (202) as described in relation to FIG. 3 and is located above a blowout preventor ("BOP") (216) as described in relation to FIG. 2. The RCD (202) and BOP (216) are integrated into an MPD system such as MPD system (200) as described in relation to FIG. 2.

FIG. 2 shows a diagram of the MPD system (200) in accordance with one or more embodiments. Components shown in FIG. 2 that are the same as or similar to components shown in FIG. 1 have not been re-described for purposes of readability and have the same description and function as outlined above.

In accordance with one or more embodiments, the MPD system (200) shown in FIG. 2 is used in a well site, such as the well site (100) outlined in FIG. 1, to manage the pressures in the wellbore (102). Specifically, the MPD system (200) is used to provide a closed-loop circulation system in which pore pressure, formation fracture pressure, and bottom hole pressure are balanced and managed at the surface. In accordance with one or more embodiments, the MPD system (200) uses the RCD (202) as described in relation to FIG. 3 at the outlet of the annulus (107) of the wellbore (102) to enable the circulation system to be in a closed loop. Specifically, the RCD (202) seals the annulus (107) around the drill string (108) during drilling and reciprocating using an MPD bearing. Based on the disclosure herein, it will be apparent to one skilled in the art the various configurations of an MPD system that may be used and that the particular configuration of the MPD system (200) shown in FIG. 2 is not meant to be limiting to the scope of the disclosed and claimed invention.

The MPD system (200) manages the pressures using an MPD choke (204) located downstream of the mud exiting the wellbore (102). In accordance with one or more embodiments, the MPD choke (204) is a choke manifold having a series of piping and one or more special valves, called choke valves. The choke valves can be manually or automatically controlled without departing from the scope of the disclosure herein.

The choke valves are able to move from a fully closed position to a fully opened position. In accordance with one or more embodiments, the position of a choke valve is measured by a percentage. For example, 100% may represent when the valve is in a fully opened position, 50% may represent when the choke valve is halfway closed, and 0% may represent when the choke valve is fully closed. These percentages may also relate to the amount of flow allowed through the choke valve.

The MPD choke (204) "chokes" the mud flow by partially closing one or more of the choke valves. That is, the choke valves in the MPD choke (204) may be closed to allow for any percentage of flow from 100% to 0% of the flow capacity. When the choke valves are partially closed (i.e., less than 100%), the flow rate of the mud flowing through the MPD choke (204) is reduced. Reduction of flow through the MPD choke (204) causes a back pressure to be applied to the mud flow located upstream from the MPD choke (204).

Because the MPD choke (204) is located downstream of the exit of the wellbore (102) through the RCD (202), this back pressure is applied to the annulus (107) of the wellbore (102). The amount of pressure applied in the wellbore (102) may then be controlled by the percent closure of the choke valves in the MPD choke (204). For example, to apply a higher pressure in the annulus (107) of the wellbore (102), the choke valves in the MPD choke (204) should be closed more (i.e., the percentage of flow through the choke valve reduced).

Other components that are part of the MPD system (200), and as shown in FIG. 2 include an MPD flow meter (206), a rig choke (208), a rig separator (210), a mud conditioning system (212), mud pumps (214), the drill string (108), a derrick (118), and a blowout preventor (BOP) (216). The rig separator (210) is a mud-gas separator that is used to separate gas from the drilling mud. Specifically, the rig separator (210) is used to separate gas from the mud at the outlet of the rig choke (208). The MPD flow meter (206) is used to measure flow rate, mud weight, and temperature of the mud at the outlet of the MPD choke (204).

The mud conditioning system (212) includes any and all equipment required to condition the drilling mud to the specification of the drilling operation. For example, the mud conditioning system (212) may include shale shakers, mud pits, mixers, desilters, desanders, etc. The specific components included in the mud conditioning system (212) depend on the application of the MPD system (200), the drilling operation requirements, and the formations through which the wellbore (102) is being drilled.

The mud pumps (214) are used to pump the drilling mud through the standpipe line (250) and into the drill string (108) at a designated flow rate. The FIG. 2 shows the MPD system (200) having three mud pumps (214); however, any number and type of mud pumps (214) may be used depending on the flow rate requirements and available pump specifications.

The rig choke (208) is a choke manifold having a series of piping and special valves, called choke valves, used to circulate the drilling mud when the BOP (216) is closed and when the drilling mud is not being diverted into the MPD choke (204) via the BOP (216). The rig choke (208) is primarily used in well control. Specifically, the rig choke (208) is used to control downhole pressures and circulate out a kick. The rig choke (208) may also be used for other purposes, such as well testing, without departing from the scope of the disclosure herein.

The primary difference between the rig choke (208) and the MPD choke (204) is the purpose that they each serve and their location within the MPD system (200). The MPD choke (204) is to be used while drilling the wellbore (102) to manage the downhole pressures and the rig choke (208) is to be used in a well control incident to manage kick pressures and circulate out a kick.

The BOP (216) is a series of spools (i.e., connection fittings between various components of the BOP) and rams that are used to control a well control incident. Specifically, the BOP (216) is used to block off the top of the wellbore (102) to prevent a kick from uncontrollably traveling to the surface through the wellbore (102). As such, the BOP (216) is situated on the surface, connected to the wellhead, and located between the wellhead and the rig floor.

The BOP (216) may have any design known in the art. The specific design and rating of the BOP (216) depends on the drilling operation and the pressures of the formation through which the wellbore (102) is being drilled. For example, the BOP (216) may have a combination of pipe rams, blind rams, shear rams, and blind shear rams operated using hydraulic hoses and accumulators.

In accordance with one or more embodiments, the pipe ram is used to close the annular space between the pipe and the BOP (216). In accordance with one or more embodiments the pipe ram may be an annular ram (219) that is configured to be closed around any size of tubular. In other embodiments, there may be multiple pipe rams of different sizes depending on the size of pipes that may be run into the wellbore (102). For example, there may be a pipe ram that is sized to be closed around the drill string (108). There may also be a pipe ram that is sized to close around a casing string in situations where a kick may occur when running in casing.

A blind ram has no opening for tubing and closes the well by completely blocking the conduit of the wellbore (102) when there is no drill string in the well. A shear ram is decided to cut through a pipe. A blind shear ram can function as both a blind ram and a shear ram. FIG. 2 shows the BOP (216) having an annular ram (219), a double ram (218), and a lower pipe ram (220). In accordance with one or more embodiments, the double ram (218) includes two types of any of the rams listed above. The lower pipe ram (220) is a pipe ram as outlined above. In accordance with one or more embodiments, circulation above the BOP (216) may be cut off when one of the rams in the double ram (218) is closed.

FIG. 2 further shows various components included in the BOP (216). The BOP (216) is a specially designed component that allows for the drilling system (10) and other systems to operate effectively and safely while drilling and also during downtimes. In accordance with one or more embodiments, the BOP (216) is disposed on the wellhead and connected to the wellhead using a fitting such as a spool and connected using any connection known in the art, such as a bolted connection, a welded connection, a threaded connection, etc.

The BOP (216) includes one or more valves that are connected to various components of MPD system (200) one or more outlets and/or inlets. The BOP (216) may be connected to components of the MPD system (200) using any connection known in the art, such as a bolted connection, a welded connection, a threaded connection, etc. The BOP (216) may be made out of any material known in the art that can withstand the corrosive properties, temperatures, and pressure seen in drilling operations, such as a steel alloy.

The BOP (216) has a conduit (not shown) through which the drilling mud may flow within. The BOP (216) is manufactured with one or more outlets and/or inlets such as a rig choke line outlet (226), a bleed off line outlet (not shown), and a kill line inlet (232). The outlets and inlet are each formed into the sidewalls of the BOP (216). The outlets and inlet are configured to be connected to another tubular.

Thus, the outlets and the inlet are manufactured with a connection, such as a bolted connection, that corresponds to a connection on a secondary tubular. The three outlets may be used to allow the mud to flow out of the BOP (216) and the inlet may be used to allow the mud to flow into the BOP (216).

In accordance with one or more embodiments, the drill string (108) may be disposed within the conduit of the BOP (216) when the drill string (108) is deployed in the wellbore (102). Thus, mud exiting or entering the BOP (216) is exiting or entering the annulus (107) formed between the drill string (108) and walls of a wellbore such as the wellbore (102).

Turning back to FIG. 2, the rig choke line outlet of the BOP (216) allows the mud to flow from the BOP (216) to the rig choke (208) via a rig choke line (234). A valve, not pictured, may be positioned on the rig choke line (234) to control the flow of mud from the BOP (216) to the rig choke (208). The bleed off line outlet allows the mud to flow from the BOP (216) to a bleed off line (not pictured).

The kill line inlet (232) allows the mud to flow from the mud pumps (214) into the well via a kill line (236), bypassing the drill string (108). A valve, not pictured, may be positioned along the kill line (236) to control the flow of mud from the mud pumps (214) to the BOP (216).

The rig choke line (234), the bleed off line, and the kill line (236) may have connections that correspond with the connections on the corresponding outlets/inlet of the BOP (216). Furthermore, the aforementioned lines may be a series of tubular connected to one another. The tubulars may be made out of any material known in the art, such as a steel alloy.

FIG. 2 shows three potential mud flow paths through the MPD system (200). A person skilled in the art will appreciate that these flow paths are used as an example of how the BOP (216) is used to circulate mud and may be modified depending on the application. Furthermore, other flow paths may exist in the MPD system (200) without departing from the scope of the disclosure herein.

In particular, FIG. 2 shows an MPD flow path (242), a rig choke flow path (246), and a kill flow path (248). In accordance with one or more embodiments, the MPD flow path (242) is the flow path the mud takes in normal (i.e., above the BOP (216) circulation) MPD operations. In the MPD flow path (242), all rams in the BOP (216) are open and the outlets and inlets of the BOP (216) are closed.

In the MPD flow path (242), the mud flows from the mud conditioning system (212) to the mud pumps (214). The mud pumps (214) pump the mud through the standpipe line (250) and into the inside of the drill string (108). The mud flows out of the drill string (108) into the annulus (107) of the wellbore (102) through the drill bit (112). The mud travels to the top of the well and exits the wellbore (102) through the RCD (202) above the BOP (216) exiting the RCD (202) through a fluid outlet (230). From the RCD (202), the mud travels along the MPD primary line (240) to the MPD choke (204) and the MPD flow meter (206). At this point, the mud flows back to the mud conditioning system (212) and is recirculated.

In accordance with one or more embodiments, the mud does not flow through the rig choke (208) when flowing along the MPD flow path (242) unless high gases are present. In such scenarios, the MPD flow path (242) includes pumping the mud through the rig choke (208) to separate the gases using the rig separator (210).

In accordance with one or more embodiments, the MPD system (200) includes an MPD auxiliary line (252). In the MPD flow path (242), the MPD auxiliary line (252) is used to circulate mud from the mud pumps (214) to the MPD primary line (24) to keep back pressure on the well when making drill pipe connections on the drill string (108).

Specifically, when drill pipe connections are being made, there is no mud circulation through the drill string (108). As such, when a connection is being made, the mud is diverted through the MPD auxiliary line (252) to control the well using back pressure from the MPD choke (204). Once the connection is made, the flow is diverted from the MPD auxiliary line (252) back through the drill string (108).

The rig choke flow path (246) is the path that the mud follows when a well control incident occurs, and a kick is being circulated out of the wellbore (102) using the drill string (108). In the rig choke flow path (246), one or more of the rams in the BOP (216) are closed and circulation above the BOP (216) is prevented. Furthermore, the rig choke line outlet (226) of the BOP (216) is open and the bleed off line outlet and the kill line inlet (232) of the BOP (216) are closed.

In the rig choke flow path (246), the mud flows from the mud conditioning system (212) to the mud pumps (214). The mud pumps (214) pump the mud through the standpipe line (250) and into the inside of the drill string (108). The mud flows out of the drill string (108) into the annulus (107) of the wellbore (102) through the drill bit (112). The mud travels up the annulus (107) to the BOP (216).

Because of the closure of the rams in the BOP (216), the mud is unable to flow through the annulus (107) of the BOP (216) to the RCD (202) and the mud flow is diverted into the rig choke line (234) via the rig choke line outlet (226) of the BOP (216). The mud flows through the rig choke line (234) to the rig choke (208) and the rig separator (210). At this point, the mud flows back to the mud conditioning system (212) and is recirculated.

The kill flow path (248) is the path that the mud follows when a well control incident occurs, and the drill string (108) is inaccessible, or the drill string (108) is not deployed in the wellbore (102). The kill line (236) is connected to the standpipe line (250), as shown in FIG. 2, or directly connected to the mud pumps (214). In the kill flow path (248), one or more rams in the BOP (216) is closed, the kill line inlet (232) of the BOP (216) is open, and the rig choke line outlet (226) of the BOP (216) is open. Furthermore, the bleed off line outlet of the BOP (216) is closed.

In the kill flow path (248), the mud is pumped from the mud conditioning system (212) to the kill line (236) via the mud pumps (214). The mud flows through the kill line (236) into the annulus (107) of the wellbore (102) via the kill line inlet (232) of the BOP (216). Mud is removed from the annulus (107) of the wellbore (102) via the rig choke line outlet (226) of the BOP (216). The mud flows from the rig choke line outlet (226) into the rig choke line (234). The mud flows through the rig choke line (234) to the rig choke (208) and the rig separator (210). At this point, the mud flows back to the mud conditioning system (212) and is recirculated.

While FIG. 2 shows various configurations of components, other configurations may be used without departing from the scope of the disclosure. For example, various components in FIG. 2 may be combined to create a single component. As another example, the functionality performed by a single component may be performed by two or more components.

FIG. 3 depicts a cross-sectional view of the RCD (202) in accordance with one or more embodiments. The cross-sectional view of FIG. 3 depicts the RCD (202) along a plane parallel a central axis (360) of the drill string (108). The RCD (202) is operatively coupled upstream of and to components of the BOP (216). The RCD (202) provides sealing of an annulus of a wellbore, such as the wellbore (102), while drilling. The RCD (202) may, for example, include a connecting flange (306) configured to be operatively connected to a corresponding connecting flange (not shown) of the BOP (216). The RCD (202) may be connected to components of the BOP (216) using any connection known in the art, such as a bolted connection, a welded connection, a threaded connection, etc. The RCD (202) may be made out of any material known in the art that can withstand the corrosive properties, temperatures, and pressure seen in drilling operations, such as a steel alloy. The RCD (202) may be made in any shape, for example, a cylindrical shape, suitable for sealing an annulus of a wellbore.

In accordance with one or more embodiments, the RCD (202) includes an outer body (300) and an inner seal assembly (310). The outer body (300) includes an outer wall (309), which may define the shape of the RCD (202), an annular wall (305), a primary cavity (301) configured to receive, at least partially, the inner seal assembly (310), and a secondary cavity (302) configured to direct a fluid flow (307). The inner seal assembly (310) is configured to rotate within the primary cavity (301). The secondary cavity (302) includes one or more ramping surfaces (303) configured to minimize pressure fluctuations. The one or more ramping surfaces (303) may be defined by the outer wall (309) and/or the annular wall (305). The one or more ramping surfaces (303) define one or more smooth corners and/or edges as angular corners and/or edges may cause resistance to the fluid flow (307).

In some embodiments, minimizing pressure fluctuations may include reducing resistance to the fluid flow (307) that causes a pressure to drop within the RCD (202) and/or the annulus (107) by defining smooth corners and/or edges, for example, corners and/or edges having a rounded shape such as a convex and/or concave shape. Pressure drops in an annulus may cause unstable pressures allowing fluid from the formation to enter the annulus thereby causing spikes in pressure within the annulus. Pressure drops may be defined relative to pressure within the annulus. In some embodiments, minimizing pressure fluctuations may include directing the fluid flow (307) away from the pressure seal during pressure spikes using the ramping surfaces (303) to direct the fluid flow (307) obliquely to any passageways in the annular wall (305). These pressure spikes may also be referred to as a "water hammer." A water hammer may cause the pressure seal to weaken and/or fail thereby causing release of mud and fluids into the surrounding environment.

In accordance with one or more embodiments, the primary cavity (301) and the secondary cavity (302) are fluidly connected by a passageway (304) therebetween. The passageway (304) may be formed from the annular wall (305) that separates the primary cavity (301) and the secondary cavity (302). The passageway (304) is defined by having a smaller diameter relative to the primary cavity (301) and the secondary cavity (302). The annular wall (305) may be integral with the outer body (300). The passageway (304) may be any diameter suitable for allowing a BHA and a drill string, such as drill string (108), to pass through for drilling operations. The annular wall (305) and/or the outer wall (309) may define the one or more ramping surfaces (303).

In accordance with one or more embodiments, the inner seal assembly (310) is configured to be disposed around the drill string (108). The inner seal assembly (310) may be any shape suitable for being disposed around the drill string (108) and sealing the annulus (107). The inner seal assembly (310) may be made out of any material known in the art that can withstand the corrosive properties, temperatures, and pressure seen in drilling operations, such as a steel alloy. The inner seal assembly (310) includes an inner wall (314) that defines an inner cavity (311). The drill string (108) may be disposed, at least partially, within the inner cavity (311).

In accordance with one or more embodiments, the inner seal assembly (310) includes a pressure seal (e.g., a primary pressure seal (312) and/or a secondary pressure seal (313)). The pressure seal (312, 313) may be made out of any material known in the art that can withstand the corrosive properties, temperatures, and pressure seen in drilling operations, such as an elastomeric material, and will not damage a surface of the drill string (108). In some embodiments, a pressure seal (e.g., the primary pressure seal (312)) may be disposed on a distal end of the inner wall (314) forming the inner cavity (311). In some embodiments, another pressure seal (e.g., the secondary pressure seal (313)) may be disposed within the inner cavity (311). The pressure seal (312, 313) may be attached with any process known to those skilled in the art such as preformed grooves in the inner wall (314) and corresponding pre-formed flanges in the pressure seal (312, 313) configured to couple to the preformed grooves. Processes known to those skilled in the art may be used to secure the pressure seal (312, 313) to the inner wall (314) such as using adhesives, a bolting technique, and the like.

In accordance with one or more embodiments, the RCD (202) includes one or more outer seals (315) configured to prevent fluid leakage between the outer body (300) and the inner seal assembly (310). The outer seal (315) may be constructed of any material known in the art that can withstand the corrosive properties, temperatures, and pressure seen in drilling operations, such as an elastomeric material. The outer seal (315) may be attached with any process known to those skilled in the art such as preformed grooves in the inner wall (314) and/or the outer wall (309). Processes known to those skilled in the art may be used to secure the outer seal (315) to the inner wall (314) and/or the outer wall (309) such as using adhesives, a bolting technique, and the like.

In accordance with one or more embodiments, the RCD (202) includes at least one outer bearing assembly (317) configured to facilitate rotation of the inner seal assembly (310). The outer bearing assembly (317) may be any bearing known in the art that is suitable for facilitating rotation of the inner seal assembly (310) such as a ball bearing, a roller bearing, or a plain bearing made of a ceramic or metal alloy material. The outer bearing assembly (317) may be attached to the outer wall (309) and/or the inner wall (314) by processes known in the art such as bolting, welding, brazing, and the like.

In accordance with one or more embodiments, the RCD (202) includes one or more ports, such as the main flow port (331), a cooling inlet (341), and/or a conduit outlet (343), that may be configured to discharge mud and/or other fluid from the RCD (202) or to allow fluid to be injected into the RCD (202) such as cooling fluid. The one or more ports (331, 341, 343) may be fluidly connected to other drill equipment. The RCD (202) is configured to manage a wellbore pressure within an annulus of a wellbore such as wellbore (102). Drill equipment, which may be, for example, fluidly connected to the ports (331, 341, 343), may include the MPD choke (204) and the rig cooling system (150).

In accordance with one or more embodiments, the RCD (202) includes the fluid outlet (230) which is fluidly connected to the secondary cavity (302) via the main flow port (331). The fluid outlet (230) is configured to transport fluid discharged from the RCD (202) and is fluidly connected to other drill equipment configured to manage a wellbore pressure within the annulus of the wellbore. In some embodiments, the fluid outlet (230) is fluidly connected to the MPD choke (204).

In accordance with one or more embodiments, the RCD (202) includes a rotating mechanism (330) configured to rotate the inner seal assembly (310) so as to match a rotational speed (V1) of the drill string (108). The rotating mechanism (330) may include a roller (not shown) configured to contact and rotate the inner seal assembly (310), one or more gears (not shown) operatively disposed to rotate the roller, and a motor configured to rotate the one or more gears and/or the roller. The motor may be an electric motor, a pneumatic motor, or a hydraulic motor. The rotating mechanism (330) may be operatively connected to the control system (199). The rotating mechanism (330) may be configured to match the rotational velocity of the drill string (108). The rotating mechanism (330) may be controlled separately, using the control system (199), or may be operatively connected to a revolutions per minute (RPM) switch (not shown) of the top drive (130). The rotating mechanism (330) provides mitigation of rotational slipping between the pressure seal (312, 313) and the drill string (108).

In accordance with one or more embodiments, the RCD (202) includes a cooling mechanism (320) configured to control a temperature of fluids within the primary cavity (301). Downhole temperatures are very high relative to surface temperatures, the mud gains heat from the subsurface raising the temperature as it goes down a wellbore and returns. Also, cuttings recovered are also hot compared to surface temperatures. The cooling mechanism (320) may include a cooling coil configured to circulate a cooling fluid. The cooling mechanism is fluidly connected, via the cooling inlet (341), to the rig cooling system (150). The cooling fluid may include ambient air, cooled air, seawater, and/or drilling mud received from the rig cooling system (150). In some embodiments, the cooling fluid may include ambient air pumped through the cooling coil from ambient air fans configured to direct a flow of the ambient air. In some embodiments, heat exchangers such as air conditioners may be used to cool the air and direct the flow of the ambient air. In some embodiments, the cooling mechanism (320) may pump cool seawater through the cooling coil. In some embodiments, mud pumps, such as mud pumps (214) may circulate, through the cooling coil, cooled drilling mud from mud tanks.

In accordance with one or more embodiments, the RCD (202) includes a restrictor plate (e.g., a first restrictor plate (321) and/or a second restrictor plate (325)) may be operatively disposed within the RCD (202) and configured to restrict movement of the drill string (108). In some embodiments, the restrictor plate (e.g., the first restrictor plate (321)) may be operatively disposed within the passageway (304). The restrictor plate (321, 325) may be a cylindrical restrictor plate that is disposed circumferentially within the RCD (202) so as to allow the drill string (108) to pass through the cylindrical restrictor plate. In some embodiments, the restrictor plate (321, 325) may include multiple sections disposed circumferentially within the RCD (202) so as to be spaced around the drill string (108). Each section may be spaced equidistantly apart, for example three sections may be disposed within the RCD (202) and spaced apart by 120 degrees on center of each section. In some embodiments, the restrictor plate (e.g., the second restrictor plate (325)) may be operatively disposed within the inner seal assembly (310). In some embodiments, multiple restrictor plates (321, 325) may be operatively disposed within the RCD (202). Misalignment with rotation of a drill string produces very high cyclic stresses on the main seal, the RCD (202) is configured to reduce misalignment of a drill string and a central axis of a wellbore, such as the central axis (360) of wellbore (102), using the restrictor plate (321, 325). Each restrictor plate (321, 325) may include a contact layer (322) and a rotational layer (323). The contact layer (322) is configured to contact the drill string while not damaging the drill string.

In some embodiments, the contact layer (322) may be constructed from any material suitable from restricting the movement of a drill string such as an elastomeric material. Restriction of movement of a drill string may include limiting excessive vibrations of a drill string that may damage the pressure seal (312, 313). In some embodiments, the rotational layer (323) may include a bearing such as a rotational bearing or a roller bearing.

In some embodiments, the restrictor plate (321, 325) may be attached to the RCD (202) by clamps (not shown) connected to the RCD (202) using any connection know in the art such as a welding connection, a bolted connection, or a threaded connection. In some embodiments, the clamps may be spring loaded to reduce excessive vibrations of a drill string such as drill string (108). For example, the rotational layer (323) may be attached to the RCD (202) using the clamps. The contact layer (322) may be attached to the rotational layer using any connection known in the art such as an adhesive connection, bolting connection, and the like. The rotational layer (323) may include a rotating mechanism, similar to the rotating mechanism (330), and configured to rotate the restrictor plate (321, 325) to match the RPM of the drill string (108).

In accordance with one or more embodiments, the RCD (202) includes a cleaning system (350) configured to clean a surface of a drill string such as the drill string (108). The cleaning system (350) may be disposed on the RCD (202) so as to allow the drill string (108) to pass through the cleaning system (350). In accordance with one or more embodiments, the cleaning system (350) includes scrapers and/or brushes (not shown) configured to smooth a surface of a drill string. In some embodiments, the cleaning system (350) may be pads (not shown) such as half-moon shaped pads configured to scrape or clean a surface of a drill string.

In some embodiments, the pads may be spring loaded or hydraulically loaded and configured to compress against the surface of the drill string. In some embodiments, cleaning the drill string may include deburring the drill string to smooth the drill string as well as cleaning sand, mud, cement, rust and/or other particles from off the drill string (108). During drilling operations, a drill string may be damaged (e.g., scratched) leaving sharp projections protruding outward from an outer surface of the drill string, for example, damage caused by power tongs during connection of segments of the drill string. As the drill string passes through the pressure seal (312, 313), the sharp edges and particles may damage the pressure seal (312, 313).

In some embodiments, cleaning a drill string, such as the drill string (108), may provide damage mitigation to the pressure seal (312, 313) by removing particles and sharp edges on the drill string that may tear or puncture the pressure seal (312, 313). In some embodiments, the cleaning system (350) may be disposed uphole from the RCD (202) so that the drill string passes through the cleaning system (350) first if the drill string is "running in-hole." In some embodiments, the cleaning system (350) may be disposed on the RCD (202), for example within the primary cavity (301), after the drill string passes through the primary seal to ensure pipe is clean during "pulling out of hole" operations.

In accordance with one or more embodiments, the RCD (202) includes a lubrication system (355) configured to deliver a lubricant to a surface of a drill string such as drill string (108). In some embodiments, the lubrication system (355) may include a lubricant applicator such as brushes configured to distribute the lubricant onto a drill string. In some embodiments, the lubrication system (355) may include a hose fluidly connected to the drilling system (10). The drilling system (10) may include a pump configured to pump the lubricant through the hose to the RCD (202). In some embodiments, the lubrication system (355) may include a lubricant compartment that is configured to store the lubricant within the RCD (202) and fluidly connected to the lubricant applicator. In some embodiments, the lubricant applicator may be the brushes of the cleaning system (350).

In accordance with one or more embodiments, the RCD (202) includes a pressure conduit (342) configured to reduce an inner pressure within the primary cavity (301) by discharging fluid such as drilling mud from the primary cavity (301). The pressure conduit (342) is fluidly connected to the primary cavity (301) via the conduit outlet (343) on one end of the pressure conduit (342). The pressure conduit (342) is fluidly connected to the fluid outlet (230) on the other end of the pressure conduit (342).

In some embodiments, the pressure conduit (342) may include a check valve (not shown) disposed at one end of the pressure conduit, for example, at the intersection of the pressure conduit (342) and the fluid outlet (230). The check valve is configured to prevent fluid going back to the primary cavity (301). In some embodiments, the pressure conduit may include an inlet valve (not shown) disposed at the conduit outlet (343) configured to prevent air being suctioned from the primary cavity (301) into the fluid outlet (230). In some embodiments, a fluid sensor (not shown) may also be operatively connected to the inlet valve and the control system (199) to prevent air being suctioned from the primary cavity (301) to ensure that only fluid that is liquid is suctioned back to an MPD system such as the MPD system (200). Air being suctioned back to the MPD system (200) will give wrong Coriolis (flow meter) readings which might make users such as drilling engineers think they have a kick (or blow out). The fluid sensor may be any sensor known in the art configured to distinguish liquid from air.

An MPD system such as the MPD system (200) is designed to give dynamic back pressure on an annulus such as annulus (107). The back pressure is acting fully on the pressure seal (312, 313) pressing hardly against a moving and rotating pipe. The back pressure acting on the pressure seal (312, 313) increases the friction between the pressure seal (312, 313) and the drill string (108). Consequently, the pressure seal (312, 313) may fail due to and operational degradation from pressure spikes, temperature degradation, damage from friction and rough surfaces of the drill string. Because the fluid is moving (dynamic) during MPD operations, fluid dynamics apply. Computational fluid dynamics (CFD) models and simulations (370) may help optimize the shape of the secondary cavity (302) and the fluid outlet (230) and even chokes. An objective of CFD is to shape the RCD (202) to minimize pressure and water hammer on the main seals. CFD is used to design an internal structure for the RCD (202). For example, the pressure seal (312, 313) may be segregated into separate cavities (e.g., the primary cavity (301) and the inner cavity (311). CFD may be used to eliminate sharp angles and utilize Venturi effect to reduce dynamic pressure in the cavity of the seals. Venturi effect says pressure reduces if a vent is open to higher velocity fluid. For example, as fluid, such as drilling mud, moves from the annulus (107) to the primary cavity (301) through the passageway (304), the velocity of the drilling mud increases as the drilling mud emerges from the passageway (304) into the primary cavity (301). This increase in velocity reduces pressure in relation to pressure in the annulus (107). The RCD (202) utilizes this pressure differential to suction or "suck" any leaked fluid back to circulation lines, e.g., via the pressure conduit (342), and reduces pressure on the pressure seal (312, 313). Also, with help of CFD, fluid in the annulus (107) closer to the fluid outlet (230) is gradually deflected to the fluid outlet (230), for example, the one or more ramping surfaces (303) may be used to gradually deflect fluid to the fluid outlet (230). While fluid in the annulus (107) opposite to the fluid outlet (230) could have a splitter such as a sectional blade that deflects the fluid to either side which is then gradually deflected to the fluid outlet (230). The fluid outlet (230) of the RCD (202) may be gradually deflected, for example, an angle less than 90 degrees normal to an outer surface of the outer body (300).

In some embodiments, CFD may be used to determine diameters of the fluid outlet (230), the pressure conduit (342), the passageway (304) as well as any other port and/or cavity (e.g., the primary cavity (301) and/or the secondary cavity (302)) in order to optimize the suction rate and the flow rate among other parameters. For example, if the diameter of the pressure conduit (342) is too small, the pressure conduit (342) will have higher suction pressure but low flow rate. If the pressure conduit (342) is too large, the pressure conduit (342) will have low pressure but high suction rate.

Figure 4:
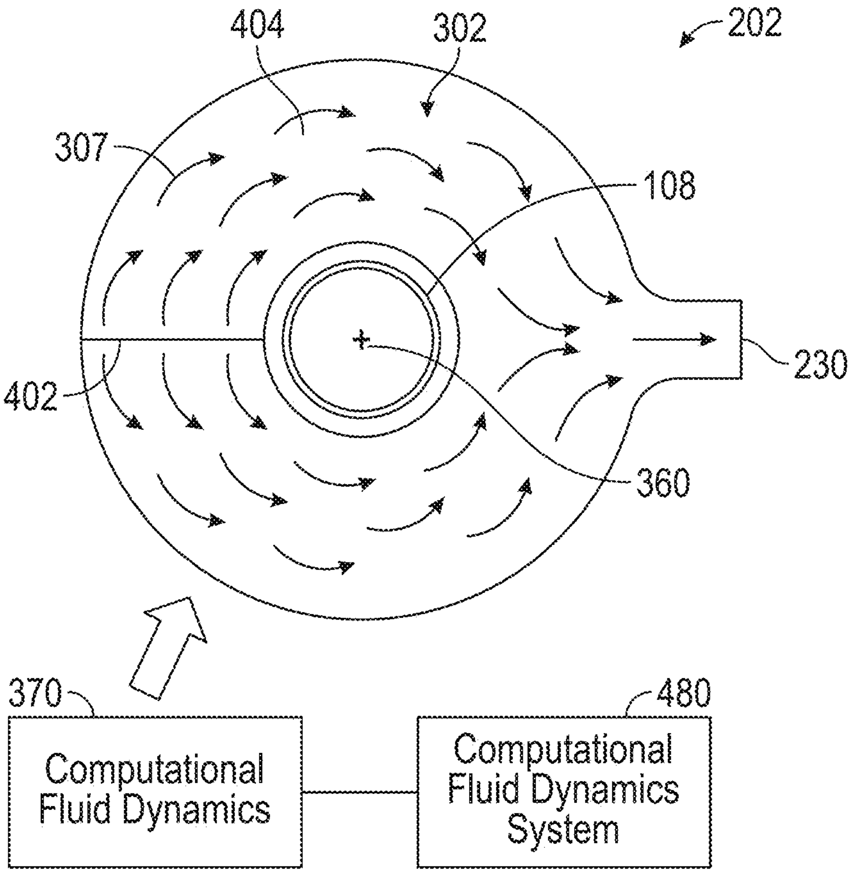
FIG. 4 depicts a cross-sectional view of a rotating control device in accordance with one or more embodiments.

FIG. 4 shows a cross-sectional view of the RCD (202) in accordance with one or more embodiments. The cross-sectional view of FIG. 4 depicts the secondary cavity (302) along a plane perpendicular to the central axis (360) of the drill string (108). The RCD (202) may include a sectional blade (402) configured to split a fluid flow such as fluid flow (307) within the RCD (202) and divert the fluid flow (307) toward the fluid outlet (230).

In some embodiments, the sectional blade (402) is opposite of the fluid outlet (230) within the secondary cavity (302). The inner surface of the secondary cavity (302) may be configured to divert flow gradually from the secondary cavity to the fluid outlet (230). For example, the secondary cavity (302) may decrease in volume away from the fluid outlet (230). So, one of the ramping surfaces may form a roof (404) of the secondary cavity (302) and may slope at an angle, for example, 30 degrees from vertical in relation to the drill string (108), from the sectional blade (402) toward the fluid outlet (230) thereby increasing the volume of the secondary cavity (302) nearer to the fluid outlet (230).

In some embodiments, the fluid outlet (230) may also be angled, for example, 30 degrees from vertical in relation to the drill string (108), similarly to the slope of the roof of the secondary cavity in order to mitigate any pressure fluctuations. The example fluid flow arrows shown in FIG. 4 show the fluid flow (307) being directed toward the fluid outlet (230) by a combination of at least the sectional blade (402) and one of the ramping surfaces (303) formed by the inner surface of the secondary cavity. It will be apparent to those skill in the art that the arrows showing the fluid flow (307) are for example purposes and are not meant to be limiting.

In accordance with one or more embodiments, the inner surface of the secondary cavity may be derived through a computational fluid dynamics ("CFD") investigation using CFD models and simulations (370). CFD models and simulations (370) may be used to identify the flow behavior within the RCD (202) such as the secondary cavity. The CFD investigation using the CFD models and simulation (370) may be performed to quantify the annular flow parameters and to identify RCD flow characteristics. The CFD investigation may be used to consider the interaction between the flow within the annulus (107) and flow from the annulus (107) to the RCD (202). A three-dimensional annulus and RCD model may be formed using a fluid dynamics equation such as a three-dimensional Navier-Stokes equation for analyzing the flow within the annulus (107) and the RCD (202). The Navier-Stokes equation may be configured to incorporate a multi-phase fluid such as mud flow mixed with formation fluids. The Navier-Stokes equations along with a near-optimal solver provide an efficient computational fluid dynamics framework for analyzing fluid flow in the annulus (107) and the RCD (202). Thus, Navier-Stoke equations may be incorporated in the fluid dynamics model to solve for the transient flow behavior in the annulus (107) and the RCD (202). When pressure drops within the RCD (202) and the flow behavior is identified consequently, the required structural surface modifications may be deduced by coupling the outputs of an RCD flow profile with the annulus transient flow behavior. This operation may aid in optimizing structural flow surfaces such as one or more ramping surfaces based on fluid flow dynamics during drilling operations.

In some embodiments, the RCD (202) may be designed using a CFD system (480). The CFD system (480) is used by fluid dynamics investigators to visualize and analyze flow dynamics of a well and the RCD (202). The fluid dynamics investigators may incorporate subsurface data with drilling parameters to model and simulate fluid flow within the annulus (107) and the RCD (202). Surface data such as formation fluid parameters, subsurface and fluid pressures derived from direct measurements such as pressure and/or temperature and/or from remote sensing measurements such as well logs. A CFD system may be used to perturb surfaces of the RCD (202) such as the inner surface of the secondary cavity to analyze how the fluid flow may change. The CFD system may be configured to remove sharp angles and/or corners to analyze if pressure spikes and drops are mitigated. Other parameters investigated may include size of the fluid outlet (230), sizes of one or more ports, angles of the ramping surfaces (303), size of the passageway (304), and the like.

The CFD system (480) includes essential tools for fluid dynamics investigators involved in drilling operations, helping them make informed decisions about RCD structure and how certain pressure dynamics may affect drilling operations. The CFD system (480) may be a specialized computer system used by fluid dynamics investigators for analyzing and interpreting fluid flow data. CFD modeling involves intensive tasks like dynamic data visualization and 3D modeling. For example, data visualization may include rendering tens of gigabytes of data within several seconds in accordance with one or more embodiments. The CFD system (480) may include a computer system, such as the computer system (500) described in relation to FIG. 5. A high-performance CFD system with a powerful processor, ample memory, and a high-resolution display is essential to handle these computationally demanding tasks efficiently. The CFD system (480) will typically be configured with appropriate fluid dynamic processing and analysis software and augmented with a number of purpose specific elements, such as high-capacity tape drives and/or hard drives connected through high-speed buses to computer processing units ("CPUs"). Further the CPUs of the CFD system (480) will typically be connected to a plurality of graphical processing units ("GPUs") that perform many of the computationally intensive operations on the fluid dynamic data, banks of high-speed tape, or hard-drive, readers to read the data from storage, high-speed tape or hard-drive writers to output final or intermediate results, and high-speed communication buses to connect these elements. Dedicated GPUs may be utilized for rendering of the CFD models and simulations data to enable smooth and interactive visualization. GPUs with high memory and parallel processing capabilities accelerate tasks like volume rendering and model visualization.

It will be appreciated by a person having ordinary skill in the art that the fluid dynamic data are extremely large, typically occupying hundreds of Gigabytes to Terabytes of data samples and cannot be manipulated or "processed" without the assistance of the CFD system (480) purposely configured to handle the fluid dynamic data such as the CFD models and simulations (370). Based upon the disclosure provided herein, one of ordinary skill in the art will appreciate that the processing of the data involves specialized tools to obtain the vast quantities of data, and high-speed processing capability capable of performing at least one thousand calculations per second. Indeed, in some embodiments, processors capable of millions, billions, or even more calculations per second are used.

Essential peripherals like keyboards, mice, and graphics tablets enable efficient interaction with data and software interfaces. Color-calibrated, and high-accuracy input devices enhance the precision of interpretation tasks like designing structural surfaces. The CFD system (480) should have backup solutions in place to protect valuable data from loss or damage. Automated backup systems, external storage devices, or network-attached storage (NAS) can be utilized to ensure data safety. In some cases, subsurface interpreters may need remote access to the CFD system (480) or collaborate with colleagues remotely. Setting up remote access capabilities, such as Virtual Private Networks (VPNs) or remote desktop solutions, allows interpreters to work from different locations and share their work effectively. The CFD system (480) may be customized to meet the needs of investigators and the specific requirements of projects. The hardware specifications may vary based on factors like the complexity of interpretations, the size of data sets, and the software tools utilized.

Figure 5:
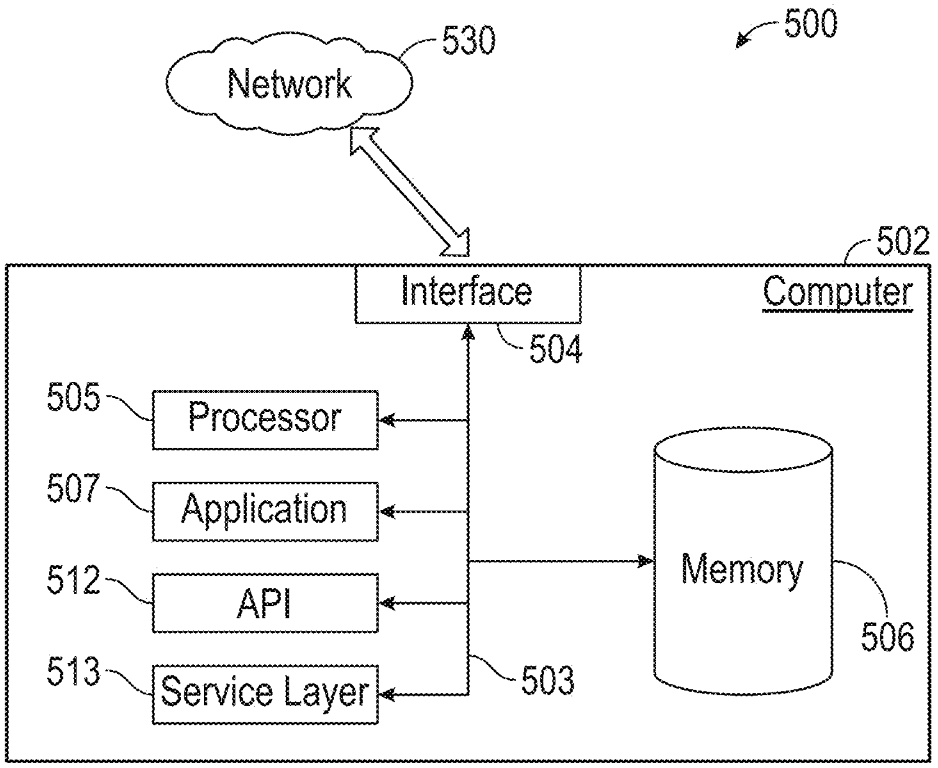
FIG. 5 depicts a computer system that may be used in various embodiments.

Embodiments may be implemented on a computer system. FIG. 5 is a block diagram of a computer system (500) including a computer (502) used to provide computational functionalities associated with described algorithms, methods, functions, processes, flows, and procedures as described in the instant disclosure, according to an implementation. The illustrated computer (502) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (502) may include a computer that includes an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. The illustrated computer (502) is communicably coupled with a network (530). In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502)) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502). The functionality of the computer (502) may be accessible for all service consumers using this service layer. Software services, such as those provided by the service layer (513), provide reusable, defined business functionalities through a defined interface. For example, the interface may be software written in JAVA, C++, or other suitable language providing data in extensible markup language (XML) format or other suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or sub-modules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504 includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (505). Although illustrated as a single computer processor (505) in FIG. 5, two or more processors may be used according to particular needs, desires, or particular implementations of the computer (502). Generally, the computer processor (505) executes instructions and manipulates data to perform the operations of the computer (502) and any algorithms, methods, functions, processes, flows, and procedures as described in the instant disclosure.

The computer (502) also includes a memory (506) that holds data for the computer (502) or other components (or a combination of both) that can be connected to the network (530). For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502).

The application (507) is an algorithmic software engine providing functionality according to particular needs, desires, or particular implementations of the computer (502), particularly with respect to functionality described in this disclosure. For example, application (507) can serve as one or more components, modules, applications, etc. Further, although illustrated as a single application (507), the application (507) may be implemented as multiple applications (507) on the computer (502). In addition, although illustrated as integral to the computer (502), in alternative implementations, the application (507) can be external to the computer (502).

There may be any number of computers (502) associated with, or external to, a computer system containing computer (502), each computer (502) communicating over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

Embodiments of the present disclosure may provide at least one of the following advantages. The rotating control device disclosed herein can be used for improved pressure management while drilling. The rotating control device provides mitigation in seal degradation prolonging the life of the seals. The prolonged life of the seal results in lower costs due to less drilling down-time and less drilling troubles due to loss of pressure control. The improved pressure management also reduces safety hazards due to loss of pressure control such as well pressure kicks. The rotating control device minimizes or may even eliminate wear that results from the rotational slip velocity, enhances drill-pipe lubrication and minimizes strip-in friction and the resulting wear, minimizes damage resulting from the uneven distribution of stresses due drill-pipe misalignment, reduces temperature in the bearing, and reduces the effects of water hammering.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A rotating control device for sealing an annulus of a wellbore while drilling using a drill string and a blowout preventor, the rotating control device comprising:

an inner seal assembly configured to be disposed around the drill string and comprising at least one pressure seal;

an outer body configured to be operatively coupled to the blowout preventor and comprising:

a primary cavity configured to receive, at least partially, the inner seal assembly, and a secondary cavity configured to direct fluid flow and comprising at least one ramping surface configured to reduce a pressure fluctuation, wherein the primary cavity and the secondary cavity are fluidly connected by a passageway therebetween;

at least one outer seal configured to prevent fluid leakage between the outer body and the inner seal assembly;

at least one outer bearing assembly configured to facilitate rotation of the inner seal assembly; and a fluid outlet fluidly connected to other drill equipment configured to manage a wellbore pressure within the annulus of the wellbore.

2. The rotating control device according to claim 1, further comprising a rotating mechanism configured to rotate the inner seal assembly so as to match a rotational speed of the drill string.

3. The rotating control device according to claim 1, further comprising a cooling system configured to control a temperature of fluids within the primary cavity.

4. The rotating control device according to claim 1, further comprising a first restrictor plate operatively disposed within the rotating control device and configured to restrict movement of the drill string.

5. The rotating control device according to claim 4, wherein the first restrictor plate is operatively disposed within the passageway.

6. The rotating control device according to claim 5, further comprising a second restrictor plate operatively disposed within the inner seal assembly and configured to restrict movement of the drill string.

7. The rotating control device according to claim 1, further comprising a cleaning system configured to clean a surface of the drill string.

8. The rotating control device according to claim 7, wherein the cleaning system comprises brushes configured to smooth the surface of the drill string.

9. The rotating control device according to claim 1, further comprising a lubrication system configured to deliver a lubricant to a surface of the drill string.

10. The rotating control device according to claim 1, further comprising a fluid conduit fluidly connected to the fluid outlet and configured to reduce an inner pressure within the primary cavity.

11. A drilling system for managing pressure within an annulus of a wellbore while drilling, the drilling system comprising:

a managed pressure drilling system comprising:

a derrick configured to suspend and rotate a drill string;

the drill string suspended by the derrick within the wellbore and comprises a bottom hole assembly configured to cut into a subsurface rock;

a managed pressure drilling choke configured to partially close to apply a back pressure on the wellbore to drill the wellbore using a managed pressure drilling technique;

a blowout preventor installed downhole from a rotating control device on the wellbore; and the rotating control device configured to provide a managed pressure drilling flow path from the annulus of the wellbore to the managed pressure drilling choke, the rotating control device comprising:

an inner seal assembly configured to be disposed around the drill string and comprising at least one pressure seal;

an outer body configured to be operatively coupled to the blowout preventor and comprising:

a primary cavity configured to receive, at least partially, the inner seal assembly, and a secondary cavity configured to direct fluid flow and comprising at least one ramping surface configured to minimize a pressure fluctuation, wherein the primary cavity and the secondary cavity are fluidly connected by a passageway therebetween;

at least one outer seal configured to prevent fluid leakage between the outer body and the inner seal assembly;

at least one outer bearing assembly configured to facilitate rotation of the inner seal assembly; and a fluid outlet fluidly connected to other equipment of the managed pressure drilling system configured to manage a wellbore pressure within the annulus of the wellbore.

12. The drilling system according to claim 11, further comprising a power system having a power conduit configured to deliver power to a rotating mechanism configured to rotate the inner seal assembly so as to match a rotational speed of the drill string.

13. The drilling system according to claim 11, further comprising a cooling system configured to control a temperature of fluids within the primary cavity.

14. The drilling system according to claim 11, wherein the rotating control device further comprising a first restrictor plate operatively disposed within the rotating control device and configured to restrict movement of the drill string.

15. The drilling system according to claim 14, wherein the first restrictor plate is operatively disposed within the passageway.

16. The drilling system according to claim 15, wherein the rotating control device further comprising a second restrictor plate operatively disposed within the inner seal assembly and configured to restrict movement of the drill string.

17. The drilling system according to claim 11, wherein the rotating control device further comprising a cleaning system configured to clean a surface of the drill string.

18. The drilling system according to claim 17, wherein the cleaning system comprises brushes configured to smooth the surface of the drill string.

19. The drilling system according to claim 11, further comprising a lubrication system configured to deliver a lubricant to a surface of the drill string.

20. The drilling system according to claim 11, wherein the rotating control device further comprising a fluid conduit fluidly connected to the fluid outlet and configured to reduce an inner pressure within the primary cavity.

* * * * *